United States Patent [19]

Gidlow

[11] 4,187,323

[45] Feb. 5, 1980

[54] COLORED WHEY

[76] Inventor: Rolf G. Gidlow, 4473 Olson Lake Trail, Lake Elmo, Minn. 55042

[21] Appl. No.: 714,311

[22] Filed: Aug. 16, 1976

[51] Int. Cl.² ............................................. A23C 21/00
[52] U.S. Cl. .................................... 426/250; 426/540; 426/583
[58] Field of Search ............... 426/250, 540, 583, 471; 106/124; 8/62

[56] References Cited

U.S. PATENT DOCUMENTS

| | | | |
|---|---|---|---|
| 1,944,880 | 1/1934 | Finkel | 426/250 |
| 2,628,904 | 2/1953 | Healy | 426/250 |
| 3,088,829 | 5/1963 | Rapaport | 426/250 |
| 3,737,326 | 6/1973 | Basso | 426/583 |
| 3,943,264 | 3/1976 | Davis | 426/583 |

*Primary Examiner*—Hiram H. Bernstein
*Attorney, Agent, or Firm*—Thomas A. Lennon

[57] ABSTRACT

A novel spray-dried, colored whey product intended for incorporation in baked goods such as doughnut, bread, pastry, and cake mixes, and a novel premix for the preparation of such baked goods. The product is formed by forming a liquid solution of whey solids and an edible coloring, such as yellow, and processing the mixture in any conventional spray-drying processing equipment which will produce a preferably nonhygroscopic, finely particulated, dry, colored, whey product capable of dry-blending with other ingredients such as flour, sugar and shortening to form the aforementioned pre-mixes.

12 Claims, No Drawings

COLORED WHEY

In both the commercial and consumer type mixes for baked goods such as doughnuts, breads, cakes and pastries, it is considered psychologically desireable to utilize a mix which is yellow or yellowish in coloration to give the impression that the product contains substantial quantities of egg and butter. Whether the user is consciously aware of the origin of the yellow color or not, the average user considers flour products having yellowish coloration of be a better quality product.

In the field of cake mixes, a variety of different procedures have been utilized to date to accomplish this yellow coloration. One such procedure includes simply blending in the dry cake mixture pellets, pills or granules of the powdered undiluted coloring material containing artificial or natural coloring which dissolve or at least go into suspension in a liquid. As such coloring material normally constitutes as little as 1/10,000 of the final mix it is obviously difficult to achieve an even distribution of the coloring matter. Furthermore, at such dilution ratios, the color hue of the color particles becomes masked to a great extent by the multitude of the other particles in the mix. Another procedure involves including in the dry mixture a carrier, such as starch, which has been pre-blended with some form of coloring. In the latter situation, the starch is pre-blended with the desired color and then physically blended with the other dry ingredients so that the overall impression of the dry blend is yellowish. The aforementioned procedures have not proven as satisfactory as the makers of cake mixes and other dessert, bakery and pastry mixes would like, because of the difficulty in attaining uniformity of color and of attaining a particular intensity or desired depth of coloration.

I have discovered that the solution to the aforementioned problems can be achieved by using colored whey powder rather than starch or including dissolvable or soluble pills or granules containing concentrated coloring. The use of colored whey is substantially less expensive than presently available methods and is much more effective in attaining the desired intensity and depth of color and in obtaining uniformity of color distribution throughout the finely dry-blended product, in addition to adding beneficial nutrients to the end product.

In addition, this new product opens up a whole new opportunity to utilize whey, which is the watery part of milk that separates from the curds during the cheese making process, and which is presently available in such large quantities as a by-product of the cheese industry and other processes, that it is commonly thrown away for lack of a useful outlet. Much of the whey produced goes to waste because there are not many known commercial uses for whey and, as a result, whey is very commonly simply thrown away or dumped, and because of this it is a relatively inexpensive raw material or source material.

It is believed that the colored whey product of this invention is the first colored whey product of any kind to ever have been made anywhere, regardless of the particular usage to which it is put, and the colored whey product is so radically new that it is anticipated that through new product experimentation and development, many new uses for the product will be found, since whey itself is both edible and nutritional. Not only is the colored whey per se new, but its inclusion in dry bakery product mixes is certainly a radically new concept.

The process involved in making the new product is a relatively simple one, and this adds to the attractiveness of the concept, since it does not require the development of new types of equipment and methods, but rather enables conventional equipment to be used in large part.

The invention is not limited to any particular color, but the most prominent usage, as presently known, relates to yellow coloring because this is the color most commonly desired in bread and cake mixes. It will also be understood that, as used herein, the term "colored whey" refers to whey having some color other than the natural color of the whey itself, that is, having a color which has been added thereto, so that the whey is artificially colored, instead of having its natural color, that is, the color it has when it comes from the cheese making process, it being understood that whey has different colors or shades, depending on the process from which it is derived. It is also conceivable that the situation may arise where some off-colored whey might be put to better use by giving it an attractive white or off-white color, and it is also within the broad concepts of this invention to use whey in its natural uncolored form to provide a change in the color effect of a dry mix or a finished product.

Some whey even has a natural yellowish tint to it, and, depending on the color desired in the pre-mix or end product, such naturally yellow colored whey might be suitable for use without the use of artificial color additives.

Whey can be either acidic or sweet. The sweet type, such as sweet dairy whey, is preferred, because it is easier to dry than the acidic form, but the acidic form does come within the scope of the broadest concepts of this invention.

The formulation of the colored whey product will depend in large part upon the end usage to which it is to be put, since any color can be used and since the shade, depth, and intensity of color can be controlled by controlling the formulation. As a typical example, one of the present preferred adaptations of this invention involves a colored whey for use with commercial doughnut bread and cake mixes which are sold to commercial establishments, such as bakeries. In this particular adaptation, a preferred formulation involves dried sweet dairy whey solids in the amount of 98.875 percent by weight, a color additive in the form of FD&C yellow food coloring #6 in the amount of 0.125 percent, and FD&C yellow food coloring #5 in the amount of 1.0 percent.

The aforementioned FD&C colors are certified food colors certified as acceptable for use by the U.S. Food and Drug Administration, usually referred to as the FDA, and the names are the "official" FDA names, said official names, together with the chemical names being found in the Color Certification Regulations and other publications and indexes of the FDA.

These whey solids and coloring are dissolved in water and spray-dried in a conventional spray-drier such as a drier made by Gray-Jensen which will produce a dried homogeneous yellow colored whey solid of very fine particle size. This colored product is then dry-blended with the flour and other ingredients of the mix in such a manner that the whey is uniformly dispersed throughout the mixture so that the mixture appears to be uniformly yellow in color. This mixture is then packaged and sold to the baker, and the bakery products resulting therefrom have a distinct attractive yellow color.

Some coloring agents are of the so-called "flashing" type, and others are of the so-called "non-flashing" type. One of the advantages and improvements of this invention is that the process of this invention eliminates the flashing problem, so that both flashing and non-flashing types of coloring agents can be used in making the colored whey of this invention, whereas in conventional processes and mixtures which do not use whey and which involve merely physically dry blending a coloring agent with the mix, only non-flashing types can be used.

Some typical examples of actual products made and the processes used according to this invention are set forth as follows:

EXAMPLE I

To a quantity of 38,686 lbs. of sweet dairy whey concentrate of 44.6% solids content was added 186.34 lbs. of FD&C Yellow #5 powder and 23.29 lbs. of FD&C Yellow #6 powder. The mixing was accomplished by first dissolving the color powder in 1,890.37 lbs. of 140° F. water in an agitated tank. Of this solution 420 lbs. was added to 7,737 lbs. of the whey concentrate in an agitated process tank. 5 batches were made and stored in an insulated feed tank prior to spray drying.

The slurry was fed to a conical type spray dryer of the type commonly known as a Swenson spray dryer with a diameter of 18 feet. The dryer had 15 nozzles designated as Spraying Systems SX series with #68 orifice and #21 core. The inlet air temperature was 280° F. and the feed rate of the solution-slurry was regulated to maintain an outlet temperature of 190° F. The resulting powdered colored whey product had a deep uniform yellow color similar to that of egg yolk.

EXAMPLE II

The product from Example I was added to a commercial doughnut mix using 1 lb. of colored whey to 99 lbs. of the doughnut mix and blended in a ribbon blender. The mixture made from this mix had a rich yellow color similar to the finished doughnuts. A control mix was prepared, which had no whey in it, but did have the same proportionate amounts of #5 and #6 yellow coloring dry blended into the doughnut mix as was present in colored whey mix. This control mix in dry, blended form prior to being made into doughnuts had a pale, unattractive, off-white appearance which was in sharp contrast to the rich yellow color of the mix containing the colored whey.

EXAMPLE III

To 1,000 lbs. of sweet dairy whey of 43.2% solids content was added 5.62 lbs. of an oil suspension of extracts from annatto and turmeric with the trade name Vegetone (Kalsec, Inc., Kalamazoo, Mich.). After high shear mixing the suspension was fed through a homogenizer and to the spray dryer as in Example I. The powdered colored whey product had a rich yellow hue similar to dried egg yolk.

In addition to packaged cake mixes, this invention includes within its scope the use of whey, wheter artificially or naturally colored, in other dry pre-mix products such as dry drink powders, gelatine desserts and puddings, and in other products such as beverages, ice cream, sherbet, cake batter, fruit toppings and sauces, and candies where the turbidity caused by whey is not detrimental, and where the inclusion of the whey is desirable, either because of its basic character and food value or nutrients, or because of the color which it carries and is able to impart either to the pre-mix or an intermediate blend, or to the final end product.

The colored whey particles formed in the aforedescribed process are homogeneously colored throughout, and not merely exteriorly coated, so that the interior of the particles is colored, as well as the exterior.

The pre-mix will vary, according to the end product desired. In the case of baked goods, the colored whey will be blended with flour, sugar and shortening in amounts which will vary, according to the particular aesthetic taste of the processor and/or end user.

Since dried sweet dairy whey is 12% protein and 75% lactose, it is apparent that the use thereof provides a nutritional extender, and the use of dried whey in a food product comes within the broader concepts of this invention.

Thus, the invention contemplates a whey product having a color added thereto, preferably homogeneously, with a yellow color being preferred for bakery product pre-mixes.

The invention further contemplates dry blending the colored whey with particulate material to give said particulate material the color of the whey in its dry blended form, with dry mixes for baked goods being one particularly appropriate type of material with which colored whey can be successfully blended to provide the desired color both in the dry pre-mix and in the finished bakery product such as cake, bread, doughnuts, etc. Although the colored whey of this invention is particularly useful as an additive for edible food for humans, the addition of colored whey to animal feeds or materials for non-edible purposes is also contemplated and comes within the scope of the invention.

The invention is not intended to be limited to addition of yellow coloring, and other colors are included within its scope.

It will, of course, be understood that various changes may be made in the various ingredients and proportions referred to herein without departing from the scope of the invention. The invention enables the party who converts the pre-mix into the finished product to determine the color of the finished end product by visual observation of the dry pre-mix since the color of the pre-mix containing the colored whey of this invention closely approximates the color of the finished end product.

As has been noted previously herein, the coloring added to the whey may be either artificial or natural. The "natural" colors are of "vegetable origin", that is, they are from sources that are neither "animal" nor "mineral" in their original or natural state. The coloring used in Example III herein is a typical example of coloring having "vegetable origin".

An alternative method and product of this invention combining whey with another material or carrier such as starch, coloring the slurry mixture of whey and carrier (starch), and then adding the colored mixture to the dry pre-mix for bread, doughnuts, or whatever, to provide the desired color for said pre-mix.

In our successful application of this alternative method and product, a slurry of whey and a slurry of starch were mixed together, yellow coloring was added, and the colored slurry was then spray dried, providing a yellow colored dry granular mixture of yellow color shade and intensity comparable to that achieved by coloring whey alone, and provided the same coloring as colored whey when added to dry bakery goods pre-mixes. The whey-starch mixture was on a 50—50 ratio by weight—that is, 50% whey and 50% starch on a solids basis. One advantage of using whey with a carrier such as starch is that there is less tendency for the spray dried colored product to lump under humid conditions, such as commonly exist in the summer time. Thus, a whey-starch mixture stays free-flowing for a longer time under humid conditions than colored whey by itself.

I claim:

1. A product comprising homogeneously mixed whey particles and first particulate material,
   said first particulate material consisting principally of flour particles,
   said whey particles incorporating a color additive and having the color of said additive,
   said first particulate material having a color different from said color additive,
   said product appearing to have the color of said color additive, and getting said appearance of said color additive from said colored whey particles in their solid state.

2. The product of claim 1, wherein said first particulate material comprises the major portion of said product.

3. The product of claim 1, wherein the ratio of said coloring additive to said whey particles is 0.5% to 2% by weight.

4. The product of claim 1, wherein said color additive is yellow.

5. The product of claim 1, wherein said color additive includes a first coloring means corresponding to FD&C Yellow #5 and second coloring means corresponding to FD&C yellow #6.

6. The product of claim 5, wherein said FD&C yellow #5 is present in the approximate amount of 0.5% to 1.5% by weight with respect to the weight of said whey, and the FD&C yellow #6 is present in the approximate amount of 0.05% to 0.5% by weight with respect to the weight of said whey.

7. The product of claim 1, wherein said color additive is artificial.

8. The product of claim 1, wherein said color additive is of vegetable origin.

9. The product of claim 1, wherein said color additive is selected from the group consisting of FD&C yellow #5 and FD&C yellow #6.

10. The product of claim 1, wherein said color additive is a color of vegetable origin selected from the group consisting of annatto, tumeric, and carotene.

11. The product of claim 1, wherein said product includes starch particles homogeneously mixed with said whey particles and first particulate material.

12. The product of claim 1, wherein said whey particles comprise approximately 1% of the total weight of said product.

* * * * *